(12) United States Patent
Baseotto et al.

(10) Patent No.: US 6,966,096 B2
(45) Date of Patent: Nov. 22, 2005

(54) DEVICE FOR CONNECTING A WIPER ARM TO A WIPER BLADE AND WIPER ARM AND WIPER BLADE USING SUCH A DEVICE

(75) Inventors: Michel Baseotto, Hasselt (DE); Christian Wilms, Beringen (DE); Hubert Verelst, Tienen (DE); Frans Breesch, Borgloon (DE); Tom Vangeel, Herk-de-Stad (DE)

(73) Assignee: Robert Bosch GmbH, (DE)

( * ) Notice: Subject to any disclaimer, the term of this patent is extended or adjusted under 35 U.S.C. 154(b) by 0 days.

(21) Appl. No.: 10/398,064

(22) PCT Filed: Oct. 26, 2001

(86) PCT No.: PCT/DE01/04020

§ 371 (c)(1),
(2), (4) Date: Mar. 31, 2003

(87) PCT Pub. No.: WO02/34593

PCT Pub. Date: May 2, 2002

(65) Prior Publication Data
US 2004/0019997 A1 Feb. 5, 2004

(30) Foreign Application Priority Data
Oct. 28, 2000 (DE) .................................. 100 53 602

(51) Int. Cl.⁷ .................................................. B60S 1/40
(52) U.S. Cl. .............................. 15/250.32; 15/250.351; 15/250.43
(58) Field of Search ..................... 15/250.32, 250.43, 15/250.44, 250.351, 250.31, 250.46

(56) References Cited

U.S. PATENT DOCUMENTS

| | | | |
|---|---|---|---|
| 5,071,020 A | 12/1991 | Reutter | |
| 5,364,290 A | 11/1994 | Hartman | |
| 5,460,439 A | 10/1995 | Jennrich et al. | |
| 5,493,750 A * | 2/1996 | Bollen et al. ........... | 15/250.452 |
| 5,605,244 A | 2/1997 | Bradshaw | |
| 5,653,144 A | 8/1997 | Fenelon | |
| 5,757,155 A | 5/1998 | Autran et al. | |
| 6,079,299 A | 6/2000 | Sundstrom | |
| 6,229,233 B1 | 5/2001 | Torii et al. | |

FOREIGN PATENT DOCUMENTS

DE            3932214        4/1991

(Continued)

Primary Examiner—Gary K. Graham
(74) Attorney, Agent, or Firm—Michael Best & Friedrich LLP

(57) ABSTRACT

The invention relates to a device to connect a wiper arm (12) to a wiper blade (14) featuring a supporting element (16) holding a wiper strip (20) on which a base element (30, 60) is fastened as the first part of a coupling device, whereby the wiper arm (12) is embodied to be U-shaped and overlaps the base element (30, 60) with its U-shape and whereby holding means (42, 72) are embodied on the wiper arm (12) within its U-shape, which holding means form a second part of a coupling device and cooperate with the first part of the coupling device. It is proposed that the holding means (42, 72) be embodied as articulated means for holding the wiper blade (14) in an articulated manner, which can also transmit a bearing force (44) on the wiper blade (14) to be exerted by the wiper arm (12) on the wiper blade (14) in an operating position and which are at least approximately completely covered by the wiper arm (12).

7 Claims, 4 Drawing Sheets

FOREIGN PATENT DOCUMENTS

Figure 1:
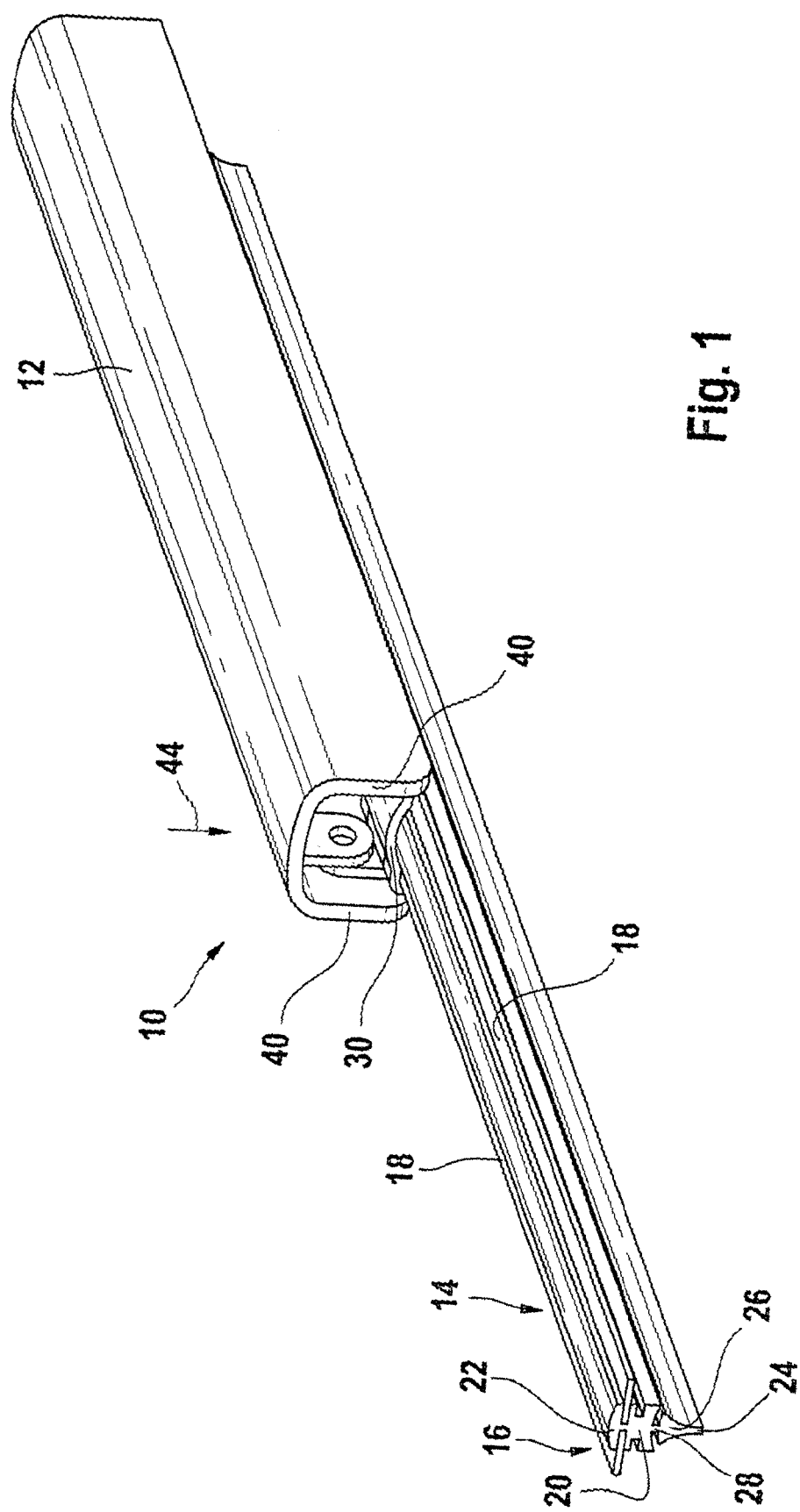

| | | |
|---|---|---|
| DE | 19634923 | 3/1998 |
| DE | 19751375 | 5/1999 |
| DE | 198 60 644 | 7/2000 |
| EP | 0241563 | 2/1992 |
| EP | 0483367 | 5/1992 |
| EP | 0753439 | 1/1997 |
| EP | 1096122 | 5/2001 |
| WO | WO 00/07857 * | 2/2000 |
| WO | WO 00/50276 * | 8/2000 |
| WO | WO 01/64488 | 9/2001 |
| WO | WO 01/86363 | 11/2001 |

* cited by examiner

DEVICE FOR CONNECTING A WIPER ARM TO A WIPER BLADE AND WIPER ARM AND WIPER BLADE USING SUCH A DEVICE

STATE OF THE ART

The invention relates to a device to connect a wiper arm to a wiper blade. With known wiper blades of this type (EP0 753 439 A1), a wiper arm is divided into an inner wiper arm as well as an outer cap. The inner wiper arm is composed in a conventional manner of a solid arm section and a spring-loaded articulated part linked to it, which extends into the area in which a wiper blade can be attached. The cap extends over the wiper arm, the cap first supporting itself on a solid part of the wiper arm and secondly extending up to the end of the wiper blade in the area above the linkage point for the wiper blade. The cap features a connection for the wiper blade so that the wiper blade is fixed in position. The bearing pressure from the wiper arm to the wiper blade is transmitted, however, by the extension of the inner wiper arm. An intermediate piece is inserted for this providing the connection between the wiper arm, cap and wiper blade, which requires an additional axis for this. Due to the great number of individual parts, this structure is very expensive for one and secondly not favorable for assembly.

ADVANTAGES OF THE INVENTION

The device in accordance with the invention has the advantage that the wiper arm is designed to be a single part and in the process takes on the positioning of the wiper blade, transmission of the pendulum motion required for the wiper operation, transmission of the bearing pressure as well as formative elements. Fastened to the wiper blade is a base element, which takes on the task of the conventional axis and cooperates together with the wiper arm after the wiper arm and wiper blade have been connected. An intermediate part to secure or position the connection is not required. As a result, the assembly and disassembly of wiper arm and wiper blade is simple and quick both during initial assembly of the overall system as well as during subsequent replacement of the wiper blade by the end user.

The connection is designed particularly simply if the base element features at least two wings extending in the direction of the U-base of the wiper arm, said wings featuring counter holding means corresponding to the holding means in the sense of an articulated connection. The base element can be executed as a simple plate-bending stamped part that can be manufactured cost effectively and can be fastened to a supporting element of the wiper blade. This base element can be connected permanently and therefore captively to the wiper blade and assumes the function of the articulated axis of the wiper blade that is otherwise standard and to be provided at additional expense.

Instead of an articulated axis, it is proposed that the counter holding means be embodied as projections or openings. These then correspond with the holding means of the wiper arm and thereby replace, as mentioned, the articulated axis that is otherwise standard.

If the holding means are embodied on the sides of the U-legs, it has proved to be advantageous to provide projections for these. If the wiper arm is made of plastic, the projections can be formed simply, directly on the inside of the U-legs using injection molding technology. These means of connection are not visible from the outside.

In addition to the holding means formed on the inside, additional projections can be attached that are adjacent to the wings of the base element in the assembly position and guide this element with a low amount of play. This makes particularly quiet wiper operation possible.

Improved guidance is produced if the holding means are embodied as counter wings extending at a distance from the U-legs, the counter wings overlapping with the wings of the base element in the assembly position. This produces a gap between the U-legs and the counter wings into which the wings of the base element can be inserted. Depending upon the width of the gap, a certain play or a certain pressure can be generated between the wings and the counter wings. For this reason the counter wings are embodied somewhat elastically so that they deflect and therefore can accept tolerances.

The wiper blade can be clipped into or engage in the wiper arm very simply if the holding means and/or the counter holding means feature bevels or roundings. It is also conceivable, however, for the holding means or the counter holding means to feature openings with holes in the direction of the counter holding means or holding means. These holes could have a narrowing, which then makes engaging in the corresponding projections of the counter holding means or holding means possible. Under some circumstances, an axis can be advantageous instead of projections for this.

DRAWINGS

Figure 2:
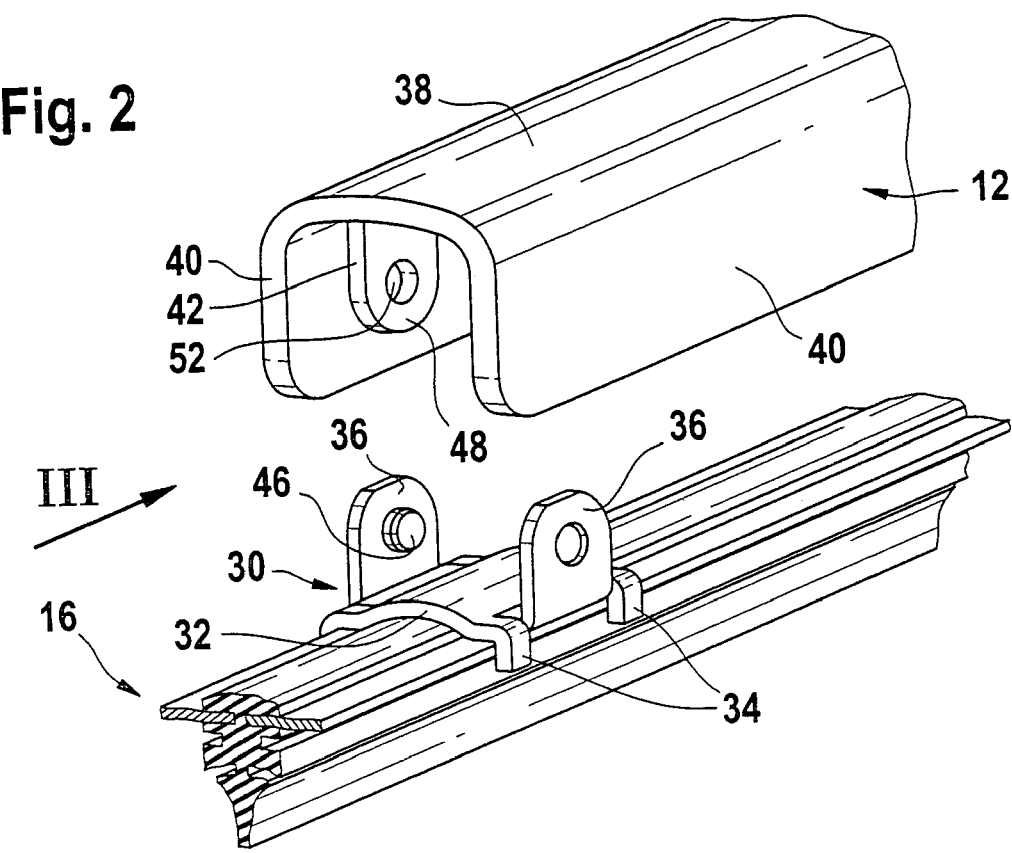
Figure 3:
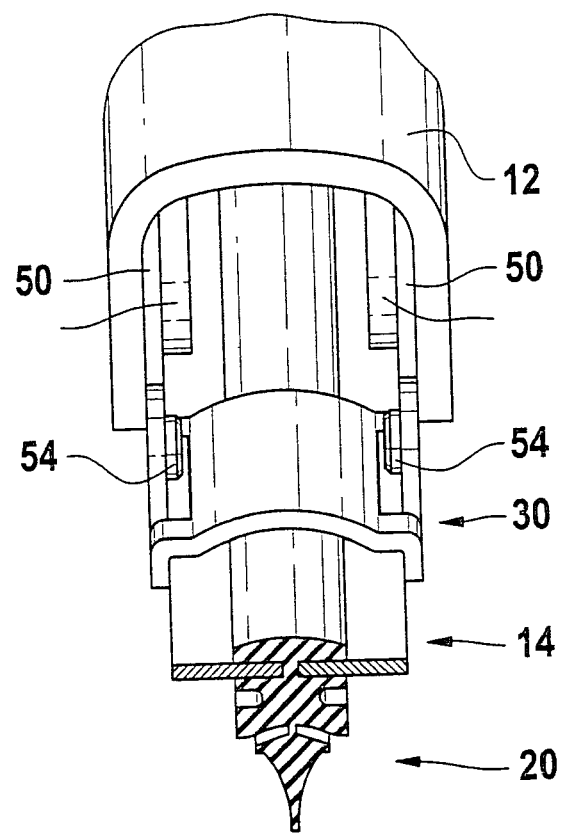
Figure 5:
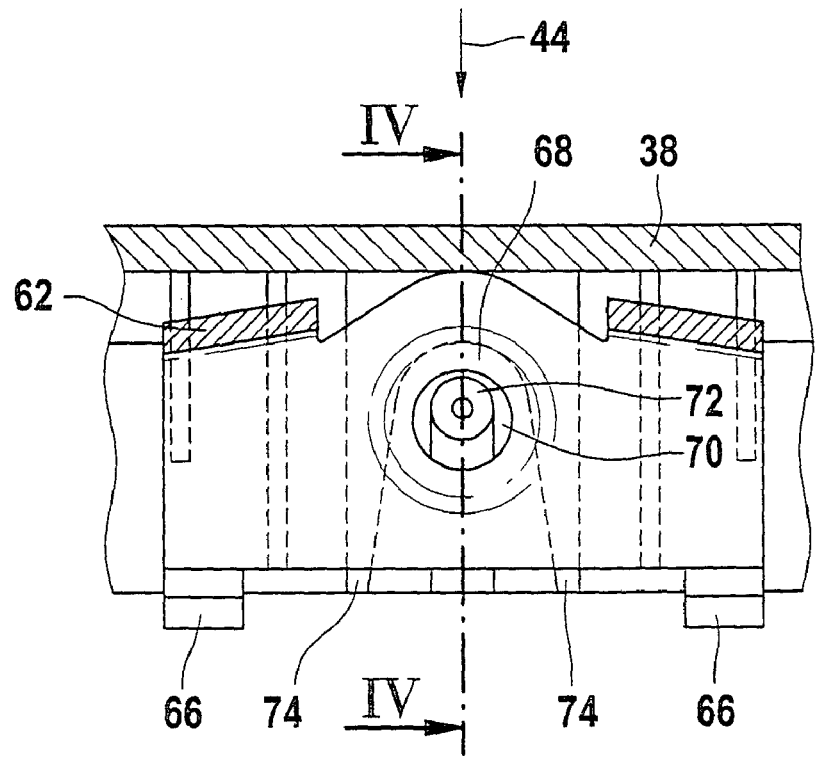
Figure 6:
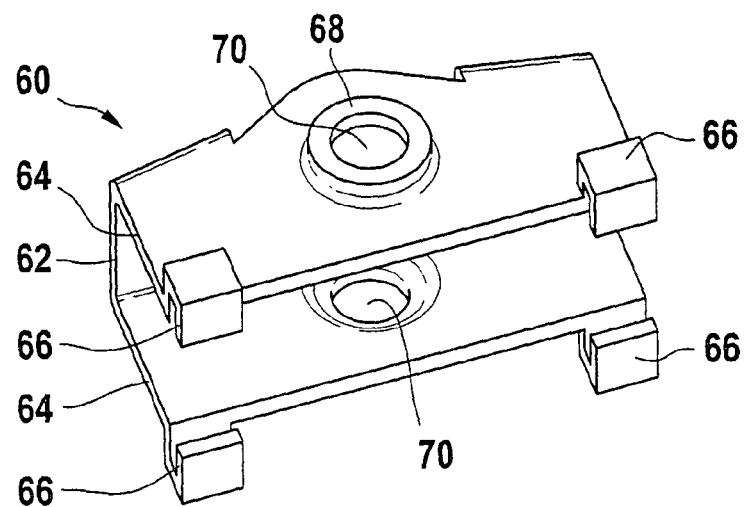
Figure 7:
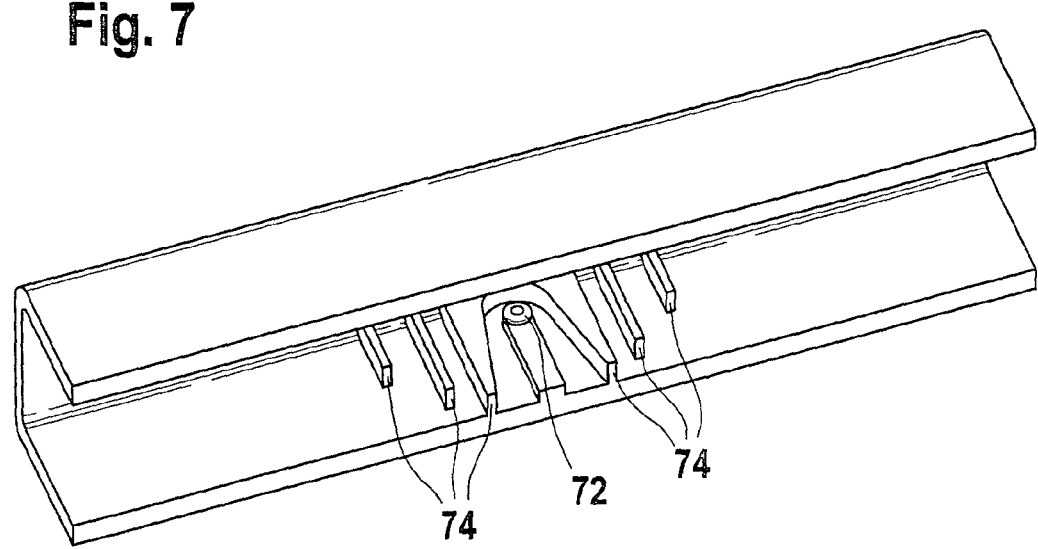

Two exemplary embodiments of the device in accordance with the invention are depicted in the drawings and explained in more detail in the following description. The drawings show:

FIG. 1 A wiper blade engaged in a wiper arm in a diagonal view,

FIG. 2 Wiper arm and wiper blade according to FIG. 1 in an unengaged position, FIG. 3 A view according to III in FIG. 2, FIG. 4 A section along line IV—IV in FIG. 5 according to the second exemplary embodiment, FIG. 5 Along line V—V in FIG. 4 without a wiper blade, FIG. 6 A base element according to the second exemplary embodiment in a diagonal representation and FIG. 7 A view diagonally from below into a wiper arm according to the second exemplary embodiment.

The individual figures are not drawn using the same scale.

DESCRIPTION

FIG. 1 depicts a wiper system 10 with a wiper arm 12 and a wiper blade 14. The wiper blade 14 features a supporting element 16, which is comprised of two strips 18, which lie in longitudinal grooves of a wiper strip 20. The longitudinal grooves are arranged in a head area 22 of the wiper strip 20, adjacent to a wiper wedge 26 featuring the wiper lip 24, which is connected with the head area 22 via a rocker bridge 28.

The wiper blade 14 in FIG. 1 is drawn in an extended form, as it occurs for example when the wiper blade 14 is guided over a very even window. In its relaxed shape that forms when lifted away from the window, the wiper blade 14 is bent in such a way that the wiper strip 20 lies in a concave inner side of the supporting element 16. When placing the wiper blade 14 on a window, the ends of the wiper blade 14 thereby contact first the window and, once there is additional pressure, the entire wiper blade lies against the window. The supporting element 16 with this kind of pre-bent shape thereby replaces the expensive support-bracket system of known bracket-mounted wiper blades.

A base element 30 also overlapping the head area 22 of the wiper strip 20 is attached to the supporting element 16 (FIG. 2). The base element features a basic body 32, which bridges over the supporting element 16 as well as the head area 22 of the wiper strip 20 and claws 34 are formed on its outer ends, which surround the strips 18 of the supporting element 16 with a form fit. The base element 30 is also welded to this form-fit with the supporting element 16, whereby a solid hold of the base element 30 on the supporting element is guaranteed, on the one hand, and the strips 18 are held in the longitudinal grooves of the wiper strip 20, on the other hand.

Extending from the base body 32 of the base element 30 are two wings 36 that extend away from the supporting element 16 approximately parallel and perpendicular to the base body 32. The base element 30 thereby represents a first part of a coupling device to connect the wiper blade to the wiper arm.

The wiper arm 12 is designed to be U-shaped with a U-base 38, onto which two U-legs 40 extending in the direction towards the wiper blade 14 are attached (FIG. 2). As shown in FIG. 1, the U-legs 40 completely overlap the base element 30 in the assembly position between the wiper arm 12 and wiper blade 14. Even in the longitudinal extension the wiper arm 12 overlaps the base element 30. In FIGS. 1 and 2, the wiper arm 12 is guided only until shortly after the area of the connection to the wiper blade 14, but in another development it can also reach the end of wiper blade 14 thereby covering the wiper blade 14 completely.

Holding means 42 are embodied on the wiper arm 12 within its U-shape, which form a second part of a coupling device, and which cooperate with the first part of the coupling device in the assembly position (FIG. 1).

The holding means 42 of wiper arm 12 cooperate with the wings 36 of the base element 30 in the assembly position in such a way that the wiper blade 14 can twist relative to the wiper arm 12. The holding means 42 are therefore articulated means for holding the wiper blade 14 in an articulated manner. A bearing force 44 on the wiper blade 14 to be exerted by the wiper arm 12 on the wiper blade 14 in the operating position is transmitted via the holding means 42, which effect a fixing of position of the wiper blade 14 relative to the wiper arm 12. The bearing force is generated by a spring that is not depicted here, which is applied, on the one hand, to the wiper arm 12, thereby representing a spring-loaded articulated part, and to a solid arm section, on the other hand.

A circular projection 46 is formed on each of the wings 36 of the base element 30, which extend towards one another, and are counter holding means, which correspond to the holding means 42 in the sense of an articulated connection. The holding means 42 are embodied in this regard as counter wings 48, which extend at a distance 50 essentially parallel to the U-legs 40. In the assembly position, the wings 36 of the base element 30 overlap with the counter wings 48 of the wiper arm 12. In the overlapping region the projections 46 are arranged on the wings 36 so that in the assembly position they project into the openings 52 correspondingly arranged in the counter wings 48.

When assembling the wiper blade 14 that is already fastened to the base element 30 with the wiper arm 12, the wiper blade 14 is guided onto the wiper arm 12 from below until the wings 36 are adjacent to the counter wings 48. Then the wiper blade is moved perpendicular to its longitudinal extension in the direction of the wiper arm 12 so that the wings 36 dip into the distances 50. As soon as the projections 46 reach the area of the counter wings 48, the counter wings 48 deflect until the projections 46 catch in the openings 42 when the wiper blade 14 is guided further up. The projections 46 are provided with bevels or roundings 54 in order to make deflection easier. Naturally, these can also be provided on the lower end of the counter wings 48.

In a second exemplary embodiment according to FIGS. 4 through 7, the same parts are provided with the same reference numbers.

Figure 4:
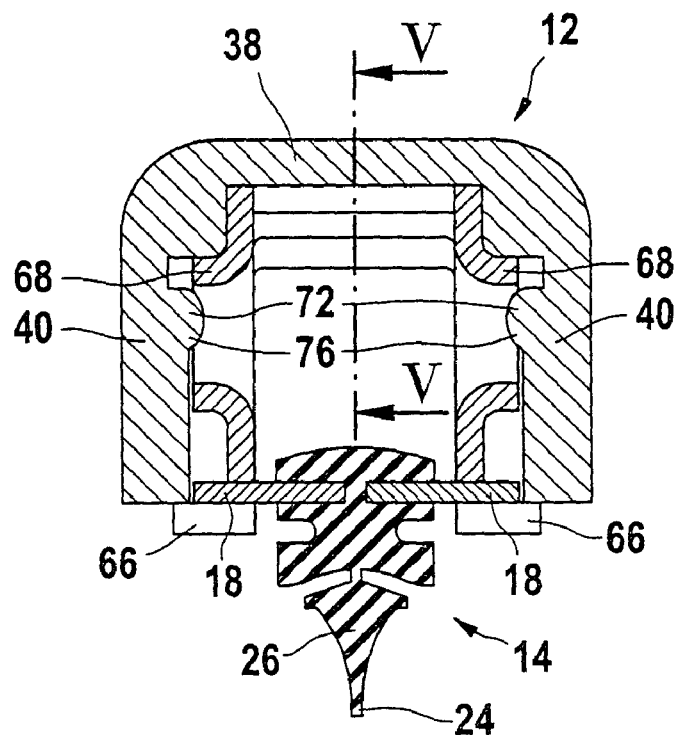

FIG. 4 depicts a section of a wiper arm 12 holding a wiper blade 14 via a coupling device. A base element 60 (FIGS. 4 and 6), which has a U-shape matching the inner contour of the wiper arm 12 with a U-base 62 and U-legs 64, is fastened on the wiper blade 14. Attached to the U-legs 64 are claws 66, which surround the strips 18 of the supporting element 16 when the base element 60 is connected with the wiper blade 14. Also in this case the base element is welded to the supporting element. Projections 68 extending in the direction of the inside of the U-leg 40 of the wiper arm 12 are attached to the U-legs 64, which, as seen from the claws 66, extend, like the wings 36, in the direction of the U-base 38. The projections 68 feature central openings 70.

Projections 72, which project into the openings 70 of the base element 60 in the assembly position, are formed on the insides of the U-legs 40 that face one another. The projections 72 are smaller in their lateral extension than the openings 70 and are adjacent to the openings 70 on one side in the assembly position. The U-base 62 of the base element 60 is removed in an area near the projections 68 and the U-legs 74 of the base element 60 are raised in an arched manner in the direction of the U-base 38 of the wiper arm 12. In the assembly position, this results in freedom of movement of the wiper blade 14 against the wiper arm 12 around a contact point between the inside edge of the opening 70 and the outside edge of the projection 72, thereby preventing the base element 60 from yielding because the U-legs 64 are adjacent to the U-base 38 of the wiper arm.

In order to keep lateral play to a minimum or to eliminate it completely, along with the projections 72, additional, strip-like projections 74 are formed on the insides of the U-legs 74.

For simpler assembly, the projections 72, which serve as holding means, feature bevels or roundings 76. If, when assembling the wiper blade, the base element 60 is introduced between the U-legs from below, the U-legs 40 deflect laterally until the projections 72 come to lie in the openings 70.

While in the case of the first exemplary embodiment both local positioning as well as transmission of the bearing force 44 take place because of the cooperation of the projections 46 with the openings 52, in the second exemplary embodiment, though positioning is achieved by the cooperation of the openings 70 with the projections 72, transmission of the bearing force 44 is achieved, however, by the cooperation of the U-base 38 with the base element's 60 U-legs 64 that continue in the direction of the U-base 38.

It should still be mentioned that the described openings can be formed by molded cavities in individual cases, which makes it unnecessary to require punching out actual holes during the manufacturing process.

A wiper arm 12 in accordance with the invention is characterized in that it features a U-shape inside of which holding means are arranged, which can cooperate with counter holding means of the wiper blade. The holding means are either embodied as counter wings 48, which extend from the U-base into the area encompassed by the U-shape, or as projections 72, which extend starting from the inside of the U-leg 40. It is also conceivable to provide both counter wings 48 as well as projections 72 in combination on the inside of the U-legs 40.

A wiper blade according to the invention is characterized in that it features a base element 30 or 60 overlapping a supporting element 16, which has wings 36 or equally acting U-legs 64 featuring projections 46 or openings 70. These wings 36 and/or openings 70 are designed in such a way that they cooperate with holding means 42 of a wiper arm 12 as counter holding means and can provide an articulated connection.

What is claimed is:

1. A device connecting an elongated wiper arm to a wiper blade featuring a supporting element holding a wiper strip on which a base element is non-rotatably fastened as the first part of a coupling device, whereby the wiper arm is embodied to be U-shaped and overlaps the base element with its U-shape and whereby holding means are embodied as unitary with the wiper arm within its U-shape, which holding means form a second part of a coupling device and cooperate with the first part of the coupling device, characterized in that the holding means is embodied as articulated means for holding the wiper blade in an articulated manner, which can also transmit a bearing force on the wiper blade to be exerted by the wiper arm on the wiper blade in an operating position and which is at least approximately completely covered by the wiper arm, wherein the holding means is embodied as laterally spaced counter wings extending at a distance from U-legs of the wiper arm, which counter wings overlap with and abut wings of the base element in an assembly position.

2. Device according to claim 1, characterized in that the base element features at least two wings extending in the direction of a U-base of the wiper arm, wherein the wings of the base element feature counter holding means corresponding to the holding means in the sense of an articulated connection.

3. Device according to claim 2, characterized in that the counter holding means are projections or openings.

4. Device according to claim 3, characterized in that the holding means are embodied as projections on facing sides of the U-legs of the wiper arm.

5. Device according to claim 1, characterized in that along with the holding means additional projections are attached, which are adjacent to wings of the base element in an assembly position.

6. Device according to claim 1, characterized in that the wings extend between the U-legs and the counter wings in the assembly position.

7. Device according to claim 1, characterized in that the holding means and/or the counter holding means feature bevels or roundings.

* * * * *